United States Patent Office 2,821,480
Patented Jan. 28, 1958

2,821,480

PROCESS OF MAKING FROZEN DESSERTS AND THE PRODUCT THEREOF

Luther D. Hilker, Oakdale, N. Y., assignor, by mesne assignments, to National Dairy Products Corporation, New York, N. Y., a corporation of Delaware No Drawing. Application August 25, 1954
Serial No. 452,213

25 Claims. (Cl. 99—136)

This invention relates to a process of making an improved frozen dessert such as ice cream comprising as the principal emulsifier a substantially pure monoglyceride and to the products obtained by this process.

Ice cream as manufactured by the usual commercial processes is a homogenized oil-in-water emulsion. The materials conventionally used in the manufacture of ice cream include milk fat, milk solids-not-fat, sugar, flavoring material and an emulsifier and/or stabilizer. A function of the emulsifier and/or stabilizer is to increase the stability of the emulsion.

Ice cream mix, after pasteurization and homogenization, may be aged and then is frozen in a mechanical freezer while air is whipped into the mass to the desired overrun to give a fine-grained, palatable product. Emulsifiers help to bind the water content of the ice cream mix and stabilize the emulsion which reduces its tendency toward churning in the freezer. This results in an ice cream which is stiff and of dry appearance as it emerges from the freezer.

The size of the air cells introduced during whipping is of importance, since the smaller air cells are associated with a finer texture in the ice cream. Here too, the emulsifier plays a part, contributing to the attainment of the desired overrun while maintaining a fine texture in the finished ice cream.

Reissue Patent No. 22,858 to Roth et al., based on No. 2,065,398 dated December 22, 1936, describes an ice cream mix employing as the emulsifier an ester of a fatty acid and a polyhydric alcohol and having one or more free alcoholic hydroxyl groups on the polyhydric alcohol component of the ester, such as mono acid glycerides, di acid glycerides and mixtures thereof. These materials have been available commercially only as a mixture of the mono- and diglycerides containing a proportion of the fully esterified glyceride, i. e., the triglyceride, and other impurities. The commercial preparation blends readily with the oil-in-water emulsion of the other ice cream components and will produce a fairly satisfactory ice cream, but the products produced in accordance with the instant invention using substantially pure monoglycerides are markedly superior in respect of consistency, texture and flavor.

Substantially pure mono acid glycerides of fatty acids have been made available in quantities sufficient for commercial ice cream use only very recently. In order to distinguish between the commercial mixtures of mono- and diglycerides heretofore available, and the relatively pure monoglycerides recently available, the latter will be hereinafter designated "substantially pure," or, more briefly, "pure" monoglycerides. The Roth et al. patent discloses the use of the monoglycerides, but does not show how they can be homogeneously dispersed in the mix. Substantially pure monoglycerides when in contact with water or ice cream mix hydrate very strongly when heated and form tough, sticky gelatinous lumps or structures. When heated, the monoglyceride particles melt but do not disperse in the mix, becoming sticky and adhering to the sides of the mixing vessel and to the blades of the stirrer. If they are mixed with the ice cream mix at a temperature below their melting point, the surfaces become hydrated and again the particles become sticky, with the same result. No way has been found before now to blend the substantially pure monoglycerides homogeneously with the other ice cream components, using standard procedures or equipment for ice cream production.

This difficulty is hard to explain in view of the fact that the commercially available mixtures of mono- and di acid glycerides are easily dispersed in water. This suggests that some component of the mixed mono- and di acid glycerides assists in dispersing the monoglyceride component thereof. However, a 1:1 mixture of the pure monoglyceride with the commercially available mixed mono- and diglycerides is no more readily dispersed in water than the pure monoglyceride alone, showing that this is not a complete explanation. This problem is not recognized in the Roth et al. patent.

The present invention overcomes the above-described disadvantages. If these pure monoglycerides before their hydration are intimately mixed with a triglyceride or other edible full fatty acid ester of a polyhydric alcohol they do not form the above-characterized structures, but rather finely divided particles which disperse readily. Advantageously, this intimate mixing is best accomplished by blending the monoglycerides and the fatty ester in their fluid or molten state. In this way the fatty ester acts as a dispersing agent or supplemental emulsifier and is so called hereinafter. The more hydrophobic the fatty ester, the better is the dispersion of the pure monoglyceride particles.

It has been found that the triglycerides such as soyabean oil or butter oil are good dispersing agents for the pure monoglycerides. The triglycerides are hydrophobic, in contrast to the diglycerides, such as glycerol distearate, which are hydrophilic. Significantly, only small amounts of the hydrophobic triglyceride are necessary to accomplish the dispersion of the monoglyceride.

In accordance with the instant invention a frozen dessert such as ice cream is provided comprising as the principal emulsifier a major proportion of an edible monoester of a polyhydric alcohol and a fatty acid and as a supplemental emulsifier a minor proportion of a full ester of a fatty acid and a polyhydric alcohol. The ice cream of the invention is superior in texture, dryness, stiffness and flavor to the ice cream produced employing the commercially available mixed mono- and diglycerides.

The principal emulsifier will be an edible monoester of a polyhydric alcohol and a fatty acid, that is, the reaction product of one hydroxyl group, on the average, per mole, of an aliphatic saturated or unsaturated straight or branched chain polyhydric alcohol having two, three or more hydroxyl groups, preferably at least two hydroxyl groups for each three carbon atoms and from two to six hydroxyl groups, with one mole of a monocarboxylic aliphatic saturated or unsaturated straight or branched chain fatty acid, preferably having from twelve to eighteen carbon atoms.

Substantially pure monoglycerides can be derived by careful refining, as by distillation, of the disproportionation (with glycerine, propylene glycol, or other edible polyhydric alcohol) or partial hydrolysis products of a naturally-occurring fat or oil, to separate out therefrom a substantially pure mixture of the monoglycerides or other alcohol monoesters of the fatty acids present in such fats and oils. Such a material will contain not more than about 10% by weight of non-monoester materials, i. e., materials other than the monoglycerides, principally, the diglycerides and free fatty acids and such material is defined as a "substantially pure monoglyceride" as the term is used in the specification and claims. These monoglycerides are available and are preferred. Exemplary are the monoglycerides derived by disproportionation with glycerol from lard, cottonseed oil, tallow, coconut oil, partially hydrogenated lard and partially hydrogenated oil.

Also useful are the edible synthetically prepared monoesters, prepared from polyhydric alcohols, such as glycerol, propylene glycol, sorbitol and the like, and acids such as lauric, stearic, oleic and palmitic, such as glycerol monolaurate, glycerol monooleate, glycerol monostearate, glycerol monopalmitate, glycerol monomyristate, propylene glycol monostearate, propylene glycol monopalmitate, propylene glycol monooleate and mixtures thereof. As has been stated, the monoglycerides would normally be employed because they are accepted components of foods.

The supplemental emulsifier will be an edible full ester of a polyhydric alcohol and a fatty acid, that is, the reaction product of each of the hydroxy groups of an aliphatic saturated or unsaturated straight or branched chain polyhydric alcohol having two, three or more hydroxyl groups, preferably, at least two hydroxyl groups for each three carbon atoms and from two to six hydroxyl groups, mole for mole with a monocarboxylic aliphatic saturated or unsaturated straight or branched chain fatty acid, preferably having from four to twenty-two carbon atoms. The triglycerides of any of the available naturally-occurring edible vegetable, animal and marine fats and oils can, in fact would ordinarily be employed as the full ester because of their lower cost. Butter fat and oil are preferred materials, inasmuch as they are normal components of frozen desserts and the amount added with the monoester in the process of the invention can be a part or all of the total milk fat (butter oil) content of the dessert.

As exemplary of fats and oils which have been used as the triglycerides and as a source of the monoglycerides (by disproportionation or hydrolysis), tallow, corn oil, coconut oil, cottonseed oil, butter oil, lard, hydrogenated lard, fish oils, olive oil, palm oil, partially hydrogenated cottonseed oil, palm kernel oil, peanut oil, sardine oils, soyabean oil and walnut oil are satisfactory. The flavor of the oil of course is important when relatively large quantities are used.

In addition to the naturally-occurring fats and oils there can also be used synthetic full esters of polyhydric alcohols, such as glycerol tristearate, glycerol tripalmitate, glycerol trimyristate, and glycerol tributyrate, as well as the diesters of nontoxic dihydric alcohols such as propylene glycol. Any of the polyhydric alcohols of from two to six carbon atoms and of the fatty acids of from four to twenty-two carbon atoms are useful.

While the invention is of broad application, as above stated, because ice cream and other frozen desserts are food products, as a practical matter edible monoesters and full esters of polyhydric alcohols will be employed because of the recognition afforded the use of these materials in foods by governmental authorities. The monoglycerides and triglycerides of the fatty acid constituents of edible natural fats and oils are permissible food ingredients, and hereafter the discussion will be in terms of the pure monoglycerides and triglycerides since these would be usually used, although it will be understood that other edible polyhydric alcohol fatty acid esters are within the scope of the invention, and that all of the ensuing discussion, including proportions of materials, applies to these, broadly.

The minimum amount of the triglyceride is critical, to effect dispersion of the pure monoglyceride. When less than 15% triglyceride is present, the monoglyceride will not be homogeneously dispersed in an aqueous medium, such as the ice cream mix. However, there is no critical upper limit on the amount of triglyceride. It is emphasized that the pure monoglycerides are the desired emulsifier, and it is their contribution which is largely responsible for the improved properties of the ice cream. Therefore, it is preferred to use as high a proportion of monoglyceride as possible, the preferred range being from 50 to 80%, the remainder being the triglyceride.

The pure monoglyceride and the triglyceride are thoroughly blended together prior to incorporation as the emulsifier mixture in the frozen dessert mix. This can be done in any of several ways. Mechanical blending may be sufficient if the particles are sufficiently finely divided. Usually, however, it is easier to blend the materials in their liquid state, followed either by dispersion of the liquid blend in the mix, or by hardening of the blend, after which it can be particulated and then dispersed in the ice cream mix. Other methods will be apparent to those skilled in the art.

In other respects the preparation of the frozen dessert mix will proceed in the manner normally used by those skilled in the art, and the ingredients can be combined in the normal way, the emulsifier among them, to give a final mix of the predetermined composition. The order of mixing is such as to permit the easy solution or dispersion of the components.

After mixing, the mixture is pasteurized either at a low temperature, long hold, such as at 160° F. for 30 minutes, or at a high temperature, short hold, such as at 175° F. for 25 seconds. The mix can be homogenized before or after pasteurization and the temperature and pressure of homogenization are not critical and will be selected to give a good subdivision of the fat and a high degree of dispersion to aid in preventing churning during freezing and to impart smoothness to the frozen product. During homogenization the viscosity of the mix may be increased. After homogenization the mix can be aged at a low temperature, say, at 40° F. or below, and held at this temperature from a few to 24 hours. Generally ageing will improve the whipping capacity of the mix and the body and texture of the finished ice cream. Thereafter, the ice cream is frozen and whipped to the desired overrun and can be extruded in the desired shape, sliced and packaged. The flavor is usually added just before freezing, chocolate being an exception.

The formulation of the frozen dessert mix is conventional, will meet government requirements, and forms no part of the instant invention.

The invention is applicable to any frozen dessert which exists in the form of oil-in-water emulsions and which contains a stabilizer and/or emulsifier to improve the emulsion stability. Ice cream, frozen custard, milk sherbet, manufactured dessert mixes, frozen confections and imitation "ice cream" are frozen desserts within this definition. In New York State these products are defined in article 4–A, section 71–a of the Agriculture and Markets Law.

The maximum total amount of emulsifier in a frozen dessert, such as ice cream, e. g., the mixed pure monoglycerides and triglycerides of the invention, is not critical, and although as much as 2% could be used, the maximum will usually be fixed by the government requirements at about 0.5%. As has been stated, preferably 50 to 80% of this is monoglyceride. The lower limit of the emulsifier is in terms of monoglyceride and will depend upon the texture, stiffness and dryness desired in the finished product. Usually about 0.05% to 0.1% monoglyceride is satisfactory. In computing this lower limit the amount of triglyceride is not taken into account; the amount of mixed mono- and triglycerides added depends only on the monoglyceride content thereof, since this is the emulsifier which controls the properties in question. More monoglycerides may be required than would ordinarily be used to obtain a given texture, dryness and stiffness when frozen dairy products such as frozen cream are used in the preparation of the frozen dessert mix.

The following are typical frozen desserts in which the emulsifiers of the invention are useful.

Ice cream is made from a combination of milk products, water and sugar, with not more than 0.5% by weight of stabilizer, and in the manufacture of which freezing has been accompanied by agitation and whipping of air into the ingredients.

Frozen custard includes what generally are known as French ice cream, French custard, ice cream parfaits and similar frozen products. It differs from ice cream in that it contains not less than 1.25% by weight of egg yolk solids. Milk sherbet is made from milk products, water and sugar, containing not more than 5% by weight of milk solids, not less than 0.35% of acid, and not more than 0.5% by weight of the stabilizer or emulsifier, and both are prepared by freezing, which may be accompanied by agitation of the ingredients.

A frozen confection is made from milk products and sugar, with not more than 0.5% of stabilizer and not less than 13% by weight total milk solids.

Imitation "ice cream," also called frozen dessert and Mellorene, are the terms generally applied to "ice creams" made from vegetable fats in place of milk fat and usually will otherwise meet the same standards as for an ice cream. Similarly, the word "imitation" would be applied to any of the other products described when vegetable fats are used in place of milk fat.

As the sugar there can be used invert sugar, syrup, corn sugar, both liquid and dry preparations, brown sugar, maple sugar and syrup, honey, molasses, sucrose and dextrose. As the milk product furnishing fat and/or solids-not-fat there can be used whole milk, cream, superheated skimmilk, condensed whole milk, sweetened skimmilk condensed, evaporated milk, butter, butter oil, dried milk, frozen milk, frozen cream, condensed skimmilk, skimmilk powder and fluid skimmilk.

Supplemental stabilizers include gelatin, Irish moss, egg white, locust bean gum, gum acacia, the alginates, carob gum, gum karaya, gum tragacanth, agar agar and sodium carboxymethyl cellulose.

The following is an example of an ice cream formulation in accordance with the invention: fat, for example, butter fat, not less than 10%; milk solids-not-fat, 11%; sugar (sucrose) 15%; gelatin, 0.1 to 0.3%; monoglycerides, 0.05 to 0.4%.

The invention is further illustrated by the following examples:

Example 1

80 parts by weight of substantially pure monoglycerides derived from edible prime lard, type 18–40 Myverol, was mixed with 20 parts by weight of butter oil. This blend was heated to 170° F. and stirred until a homogeneous mixture was obtained after which it was allowed to cool. This blend was added, at room temperature, in the amount of 0.1% to an ice cream mix of the following composition:

| | Percent |
|---|---|
| Butter fat | 10 |
| Nonfat milk solids | 11 |
| Sucrose | 15 |
| Gelatin | 0.2 |
| Water | 63.7 |

The mix was pasteurized at 160° F. for 30 minutes with agitation during which time the monoglyceride dispersed readily. It was homogenized at 2500 p. s. i. first stage and 500 p. s. i. second stage, cooled over a surface cooler, flavor added and then frozen with whipping in a continuous freezer. The ice cream which was extruded from the freezer in a shape which was rectangular in cross-section, was stiff, dry in appearance and had a good texture. It was readily cut in thin slices for use in ice cream sandwiches, in bricks for sale as packaged ice cream, and in other forms. In contrast to this, when an identical ice cream mix was prepared, using as an emulsifier monoglyceride to which butter oil had not been added, the monoglyceride would not disperse either at room temperature or when heated to 160° F., and formed a gummy mass, coating the sides of the stainless steel mixing vessel and the paddles of the stirrer.

Example 2

Example 1 was repeated employing the pure monoglycerides obtained from cottonseed oil) type 18–85 Myverol), and using cottonseed oil as the triglyceride instead of butter oil. The ice cream obtained had a good texture and was stiff and dry in appearance.

Example 3

Example 1 was repeated employing the pure monoglycerides derived from edible tallow (type 18–30 Myverol) and tallow as the triglyceride instead of butter oil and with similar results. The ice cream had a good texture and flavor and was stiff and dry in appearance as it emerged from the freezer.

Example 4

Example 1 was repeated employing the pure monoglycerides derived from hydrogenated lard (type 18–00 Myverol) and using coconut oil as the triglyceride. The ice cream obtained had a good texture and was stiff and dry in appearance.

Example 5

Example 1 was repeated employing a mixture of one part pure monoglyceride derived from lard to each part of a commercial mixture of 47% mono- and 50% diglycerides containing 3% of fully esterified triglyceride. It was not possible to emulsify the monoglycerides in the ice cream mix. The material formed a thick gummy mass which adhered to the walls of the vessel and to the paddles of the stirrer.

While the examples of the emulsifiers of the invention have been ice cream mixes, the emulsifiers can also be employed in formulations of other frozen confections such as milk sherbets, custards, imitation ice creams, etc.

The term "consisting essentially of" as it is used in the claims means that the ingredients named are the essential ingredients and that the composition does not include ingredients which would disadvantageously affect the use properties of the compostion. Thus, diglycerides and like partial esters are excluded by the term, inasmuch as they are not as desirable components of the frozen dessert as the monoglycerides. In fact, it is the principal object of the invention to provide a composition which is free from the diglycerides and other partial esters, intermediate the monoesters and full esters, of polyhydric alcohols and aliphatic fatty acids.

All parts and percentages in the specification and claims are by weight of the entire composition.

I claim:

1. In the process of preparing an oil-in-water emulsion-type homogenized, pasteurized frozen dessert including an emulsifier, which includes the steps of formulating a frozen dessert mix homogenizing, pasteurizing and freezing the mix, the improvement which comprises forming a blend consisting of a major proportion of an edible aliphatic fatty acid monoester of an aliphatic polyhydric alcohol, said monoester containing not more than about 10% nonmonoester material by weight of the monoester, and a full aliphatic fatty acid ester of an aliphatic polyhydric alcohol, said full ester being in an amount of at least 15% by weight of the blend to aid in dispersing the monoester in the mix, and then prior to homogenization and pasteurization dispersing the monoester-full ester blend in the liquid state in the mix in an amount to stabilize the oil-in-water emulsion.

2. A process in accordance with claim 1 in which the monoester and the full ester are monoglycerides and triglycerides, respectively, derived from a naturally-occurring fat.

3. The process of claim 2 in which the monoglycerides are derived from edible lard and the triglycerides are edible lard.

4. The process of claim 2 in which the monoglycerides are the monoglycerides derived from cottonseed oil.

5. The process of claim 2 in which the triglycerides are butter oil.

6. The process of claim 2 in which the monoglycerides are derived from hydrogenated lard and the triglycerides are hydrogenated lard.

7. The process of claim 1 in which the dessert is ice cream.

8. In the process of preparing an oil-in-water emulsion-type homogenized, pasteurized frozen dessert including an emulsifier, the improvement which comprises dispersing in the frozen dessert mix a blend consisting of a major proportion of an edible aliphatic fatty acid monoester of an aliphatic polyhydric alcohol, said ester containing not more than about 10% nonmonoester material by weight of the monoester, and a full aliphatic fatty acid ester of an aliphatic polyhydric alcohol, said full ester being in an amount of at least 15% by weight of the blend, the said blend being in the liquid state while being dispersed in the mix in an amount to stabilize the same and then homogenizing and pasteurizing the mix.

9. A process in accordance with claim 8 in which the monoester and the full ester are monoglycerides and triglycerides, respectively, derived from a naturally-occurring fat.

10. The process of claim 9 in which the monoglycerides are derived from edible lard and the triglycerides are edible lard.

11. The process of claim 9 in which the triglycerides are butter oil.

12. The process of claim 9 in which the monoglycerides are derived from hydrogenated lard and the triglycerides are hydrogenated lard.

13. The process of claim 8 in which the dessert is ice cream.

14. An oil-in-water emulsion-type homogenized, pasteurized frozen dessert comprising a milk product, a sugar and an emulsifier consisting essentially of a blend consisting of at least 15% by weight of the blend of an edible aliphatic fatty acid full ester of an aliphatic polyhydric alcohol and a major proportion of a substantially pure edible aliphatic fatty acid monoester of an aliphatic polyhydric alcohol, said monoester containing not more than about 10% nonmonoester material by weight of the monoester.

15. An oil-in-water emulsion-type homogenized, pasteurized ice cream mix comprising milk fat, milk solids-not-fat, a sugar and an emulsifier consisting essentially of a blend consisting of at least 15% by weight of the blend of an edible aliphatic fatty acid full ester of an aliphatic polyhydric alcohol and a major proportion of a substantially pure edible aliphatic fatty acid monoester of an aliphatic polyhydric alcohol, said monoester containing not more than about 10% nonmonoester material by weight of the monoester.

16. An oil-in-water emulsion-type homogenized, pasteurized ice cream mix comprising milk fat, milk solids-not-fat, a sugar and an emulsifier consisting essentially of a blend consisting of at least 15% by weight of the blend of a triglyceride of an aliphatic fatty acid and a major proportion of a substantially pure edible monoglyceride of an aliphatic fatty acid, said monoglyceride containing less than about 10% nonmonoglyceride material by weight of the monoglyceride.

17. An ice cream mix according to claim 16 in which the monoglyceride is derived from lard.

18. An ice cream mix according to claim 16 in which the monoglyceride is derived from cottonseed oil.

19. An ice cream mix according to claim 16 in which the triglyceride is butter oil.

20. An ice cream mix according to claim 16 in which the monoglyceride is derived from hydrogenated lard and the triglyceride is hydrogenated lard.

21. A mix suitable for homogenization, pasteurization, and freezing to form a frozen dessert, comprising a milk product, a sugar and an emulsifier consisting essentially of a blend consisting of at least 15% by weight of the blend of an edible aliphatic fatty acid full ester of an aliphatic polyhydric alcohol and a major proportion of a substantially pure edible aliphatic fatty acid monoester of an aliphatic polyhydric alcohol, said monoester containing not more than 10% nonmonoester material by weight of the monoester.

22. A mix suitable for homogenization, pasteurization, and freezing to form ice cream, comprising milk fat, milk solids-not-fat, a sugar and an emulsifier consisting essentially of a blend consisting of at least 15% by weight of the blend of an edible aliphatic fatty acid full ester of an aliphatic polyhydric alcohol and a major proportion of a substantially pure edible aliphatic fatty acid monoester of an aliphatic polyhydric alcohol, said monoester containing not more than about 10% nonmonoester material by weight of the monoester.

23. A mix suitable for homogenization, pasteurization, and freezing to form ice cream, comprising milk fat, milk solids-not-fat, a sugar and an emulsifier consisting essentially of a blend consisting of at least 15% by weight of the blend of a triglyceride of an aliphatic fatty acid and a major proportion of a substantially pure edible monoglyceride of an aliphatic fatty acid, said monoglyceride containing less than about 10% nonmonoglyceride material by weight of the monoglyceride.

24. A frozen oil-in-water emulsion-type of homogenized, pasteurized frozen dessert, comprising milk fat, milk solids-not-fat, a sugar and an emulsifier consisting essentially of a blend consisting of at least 15% by weight of the blend of an edible aliphatic fatty acid full ester of an aliphatic polyhydric alcohol and a major proportion of a substantially pure edible aliphatic fatty acid monoester of an aliphatic polyhydric alcohol, said monoester containing not more than about 10% nonmonoester material by weight of the monoester.

25. A frozen oil-in-water emulsion-type of homogenized, pasteurized ice cream, comprising milk fat, milk solids-not-fat, a sugar and an emulsifier consisting essentially of a blend consisting of at least 15% by weight of the blend of a triglyceride of an aliphatic fatty acid and a major proportion of a substantially pure edible monoglyceride of an aliphatic fatty acid, said monoglyceride containing less than about 10% nonmonoglyceride material by weight of the monoglyceride.

References Cited in the file of this patent

UNITED STATES PATENTS

| 2,587,369 | Nash | Feb. 26, 1952 |
| 2,619,422 | Diamond | Nov. 25, 1952 |
| 2,692,201 | Conrad et al. | Oct. 19, 1954 |